(12) United States Patent
Bustamante et al.

(10) Patent No.: US 11,736,404 B2
(45) Date of Patent: Aug. 22, 2023

(54) FLASH CROWD MANAGEMENT IN REAL-TIME STREAMING

(71) Applicant: Phenix Real Time Solutions, Inc., Chicago, IL (US)

(72) Inventors: Fabian E. Bustamante, Evanston, IL (US); Stefan Birrer, Chicago, IL (US)

(73) Assignee: Phenix Real Time Solutions, Inc., Chicago, IL (US)

( * ) Notice: Subject to any disclaimer, the term of this patent is extended or adjusted under 35 U.S.C. 154(b) by 0 days.

(21) Appl. No.: 17/933,044

(22) Filed: Sep. 16, 2022

(65) Prior Publication Data
US 2023/0081769 A1 Mar. 16, 2023

Related U.S. Application Data

(63) Continuation of application No. 17/147,856, filed on Jan. 13, 2021, now Pat. No. 11,451,483.
(Continued)

(51) Int. Cl.
*G06F 15/16* (2006.01)
*H04L 47/2416* (2022.01)
*H04L 67/1008* (2022.01)
*H04L 67/101* (2022.01)
*H04L 67/1029* (2022.01)
(Continued)

(52) U.S. Cl.
CPC ........ *H04L 47/2416* (2013.01); *H04L 47/823* (2013.01); *H04L 65/611* (2022.05); *H04L 65/612* (2022.05); *H04L 65/613* (2022.05); *H04L 65/80* (2013.01); *H04L 67/101* (2013.01); *H04L 67/1008* (2013.01); *H04L 67/1029* (2013.01)

(58) Field of Classification Search
CPC . H04L 47/2416; H04L 47/823; H04L 65/611; H04L 65/80; H04L 67/1008; H04L 67/101; H04L 67/1029
See application file for complete search history.

(56) References Cited

U.S. PATENT DOCUMENTS

2013/0272121 A1* 10/2013 Stanwood ............. H04L 47/805
370/230
2015/0071458 A1* 3/2015 Sullivan ................ H04L 65/612
381/77

OTHER PUBLICATIONS

International Search Report and Written Opinion dated May 12, 2021 for PCT Application No. PCT/US21/13242, 17 pages.

* cited by examiner

*Primary Examiner* — Richard G Keehn
(74) *Attorney, Agent, or Firm* — Perkins Coie LLP; Alberto Araiza; Kristen Schunter

(57) ABSTRACT

A real-time streaming service predicts an incoming flash crowd event and manages computing resources to respond to the event before traffic peaks, thus reducing the likelihood that the streaming service's resources will be overwhelmed. Embodiments of a real-time streaming server predict a flash crowd event by detecting actions by client devices during a multi-step process to access a real-time content stream from an endpoint server cluster. Initially, the endpoint server has first computing resources configured to stream the content stream to the client devices. The streaming server provisions second computing resources at the endpoint server based on a rate at which the client devices perform an action associated with a first step in the multi-step process. The second computing resources are configured to stream the real-time content stream based on a rate at which the client devices perform an action associated with a second step in the multi-step process.

20 Claims, 5 Drawing Sheets

Related U.S. Application Data

(60) Provisional application No. 62/960,534, filed on Jan. 13, 2020.

(51) Int. Cl.
*H04L 65/611* (2022.01)
*H04L 65/80* (2022.01)
*H04L 47/70* (2022.01)
*H04L 65/612* (2022.01)
*H04L 65/613* (2022.01)

FLASH CROWD MANAGEMENT IN REAL-TIME STREAMING

CROSS-REFERENCE TO RELATED APPLICATION

This application is a continuation of U.S. patent application Ser. No. 17/147,856, filed Jan. 13, 2021, now U.S. Pat. No. 11,451,483, which claims the benefit of priority to U.S. Provisional Patent Application No. 62/960,534, filed Jan. 13, 2020, which are incorporated herein by reference in their entireties.

TECHNICAL FIELD

This application is related generally to real-time streaming, and in particular to detecting and managing flash crowds in real-time streaming services.

BACKGROUND

Streaming video content over the Internet is quickly gaining popularity as a way to view video content. In a typical streaming service, video and/or audio data is streamed from a collection of servers to an electronic device (such as a smartphone, computer, tablet, or smart television) for playback by users. Real-time streaming services, however, simultaneously capture and broadcast media to users' devices, with sufficiently small delays as not to impact natural human interaction that exists, for example, between participants in the streamed content, between spectators of a live sports event wagering on the outcomes of plays, or between performers in a live event and their audience.

In order to facilitate interactions that feel natural to users and thereby to improve user retention and engagement, real-time streaming services must deliver a high quality of experience. A range of factors can impact a service's quality of experience, including start-up latency, average bitrate, and rebuffering ratio. Many of these factors are directly or indirectly affected by the load imposed on service infrastructure in terms of a number of client requests handled.

One particular challenge for real-time streaming services is the service's ability to handle transient surges in the number of clients that access (or "subscribe to") a stream. A sudden surge in the number of clients requesting the stream, also known as a "flash crowd," is often experienced after the occurrence of a significant event of widespread interest (e.g., a tsunami, the death of a public figure, or a question on the actual color of a dress). Given the high demand on resources imposed by streaming media, a flash crowd event can easily overwhelm a streaming service. A flash crowd arrives as a tidal wave, where the spike in traffic commonly occurs within a few minutes and thus gives servers only a few tens of seconds to adapt to the incoming traffic. Given that flash crowds are infrequent and unpredictable, any solution to mitigate the impact of flash crowd events would beneficially include a proactive and real-time detection mechanism and a method for immediate action that can mitigate the effects of the stress.

There has been much work to improve efficient Internet content distribution, from infrastructure-based Content Distribution Networks (CDNs, e.g., Akamai2, Limelight3) to peer-to-peer (P2P) content distribution (e.g., Gnutella, Bittorrent) to hybrid solutions that leverage the best of both approaches. While some of these platforms may be able to handle large flash crowd events, these platforms' infrastructure, organizations, and solutions naturally build on the type of data and usage patterns they aim to support. Traditionally these systems have served mostly static content (e.g., text, images), with some recent move towards video on demand (VoD) and video streaming. However, non-real-time services such as these have a high tolerance to stream lag—the time from when the event being streamed takes place and when it is delivered to subscribers.

The high tolerance to stream lag allows non-real-time services to handle surges in client requests through the use of delegation and the placement of caches along the datapath to dampen the impact of surges. For instance, a CDN can cache the (typically few) objects responsible for large percentages of requests during a flash event and rely on cooperative caching or dynamic delegation to reduce the load on the origin server during the initial phase of the flash event. However, these techniques have little efficacy for real-time media streams, where stream lag impedes or entirely precludes the ability of participants to react to or interact with the content and other subscribers in real time.

BRIEF DESCRIPTION OF THE DRAWINGS

Various features and characteristics of the disclosed technology will become more apparent to those skilled in the art from a study of the Detailed Description in conjunction with the drawings. Embodiments of the technology are illustrated by way of example and not limitation in the drawings, in which like references may indicate similar elements.

Figure 1:
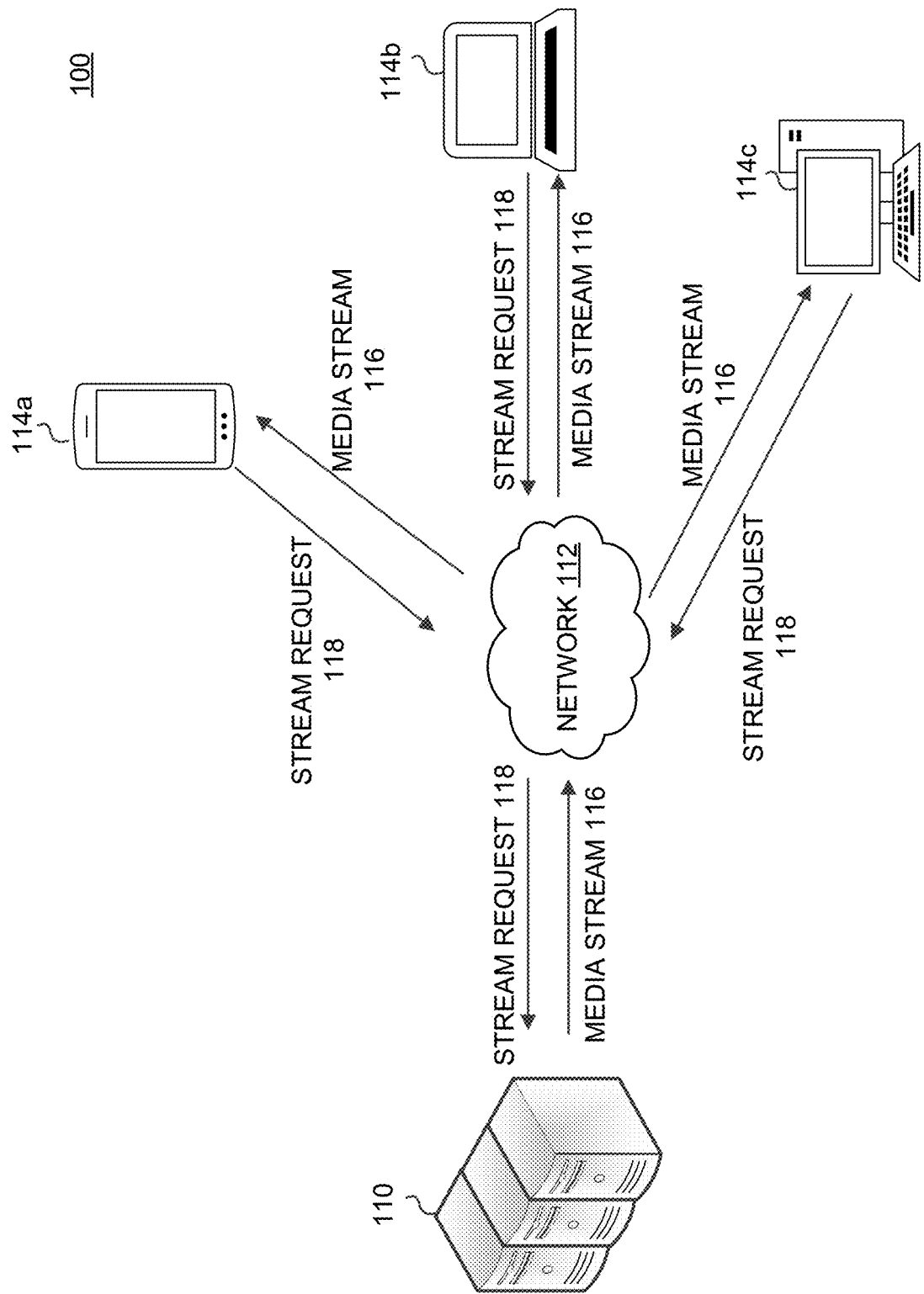
FIG. 1 is a block diagram illustrating a real-time streaming system to stream video content to a plurality of client devices.

The drawings depict various embodiments for the purpose of illustration only. Those skilled in the art will recognize that alternative embodiments may be employed without departing from the principles of the technology. Accordingly, while specific embodiments are shown in the drawings, the technology is amenable to various modifications.

DETAILED DESCRIPTION

Streaming media content over packet switched networks, such as the Internet, is quickly gaining popularity as a way to consume various media (e.g., video, audio). Electronic devices (e.g., smartphones, computers, tablets) can connect to a network (e.g., the Internet) and subscribe to various video and audio data streams. For example, multiple electronic devices (or "client devices") may subscribe to a live stream of a video call generated by an originating device. As another example, client devices may subscribe to a live stream of a sporting event.

With an increase in popularity of streaming media content also comes an increase in bandwidth and computational resource demand from users to deliver high quality video and audio streaming over the Internet. The bandwidth and computational resource demands are compounded during a flash crowd event, where a significant increase in the number of client devices attempting to access the same content stream through the same servers overwhelms the streaming capacity of those servers.

During a flash crowd event, the performance of the servers and the access to services by legitimate users becomes degraded due to sudden surge of legitimate traffic. Mathematically, a flash crowd event can be defined in terms of average request rate within a specified period of time. In some cases, a flash crowd event is a period over which request rates for a particular resource increase exponentially; that is, if the average per minute request rate over a period $t_i$ is $rate_{ti}$, the resource experiences a flash crowd if $rate_{ti} > 2^{i} * rate_{t0}$, for all $i \in [0,k]$, where k is the number of time periods. Flash crowd events overwhelm a service with legitimate requests, causing significant performance deterioration.

Embodiments of a real-time streaming service described herein predict incoming flash crowd events and manage resources to respond to the event before traffic peaks, thus reducing the likelihood that computing resources associated with the streaming service will be overwhelmed. In general, flash crowd events are predicted based on an observation that a multi-step process followed by a client device when subscribing to a stream provides multiple signals that can be leveraged to detect a potential future flash event.

In some embodiments, a method performed by a real-time streaming service for predicting and managing flash crowd events includes configuring, by a computer system such as a real-time streaming server, a first quantity of computing resources at an endpoint server cluster to stream a real-time content stream. The computer system determines a first rate of requests by client devices to connect to the endpoint server cluster. Responsive to determining the first rate of the requests to connect to the endpoint is greater than a first threshold, the computer system provisions a second quantity of computing resources at the endpoint server cluster. The computer system monitors subscriptions by the client devices to a control channel at the endpoint server cluster, where the subscriptions are based on the requests to connect to the endpoint server cluster. The computer system determines a second rate of these subscriptions, and determines whether the second rate is greater than a second threshold. Responsive to determining the second rate is greater than the second threshold, the computer system configures the provisioned computing resources for streaming the real-time content stream to one or more client devices.

Some embodiments of a real-time streaming system comprise an endpoint server cluster and a streaming server. The endpoint server cluster includes a first quantity of computing resources configured to stream a real-time content stream to client devices. The streaming server, which is communicatively coupled to the endpoint server cluster, detects actions by a plurality of client devices during a multi-step process to access the real-time content stream from the endpoint server cluster. The streaming server provisions additional computing resources at the endpoint server cluster based on a rate at which the plurality of client devices perform an action associated with a first step in the multi-step process, and configures the provisioned computing resources to stream the real-time content stream based on a rate at which the plurality of client devices perform an action associated with a second step in the multi-step process.

The embodiments set forth below represent the necessary information to enable those skilled in the art to practice the embodiments and illustrate the best mode of practicing the embodiments. Upon reading the following description in light of the accompanying figures, those skilled in the art will understand the concepts of the disclosure and will recognize applications of these concepts that are not particularly addressed herein. These concepts and applications fall within the scope of the disclosure and the accompanying embodiments.

The disclosed technology can be embodied using special-purpose hardware (e.g., circuitry), programmable circuitry appropriately programmed with software and/or firmware, or a combination of special-purpose hardware and programmable circuitry. Accordingly, embodiments may include a machine-readable medium having instructions that may be executed to test a video game.

The purpose of terminology used herein is only for describing embodiments and is not intended to limit the scope of the disclosure. Where context permits, words using the singular or plural form may also include the plural or singular form, respectively.

As used herein, unless specifically stated otherwise, terms such as "processing," "computing," "calculating," "determining," "displaying," "generating," or the like refer to actions and processes of a computer or similar electronic computing device that manipulates and transforms data represented as physical (electronic) quantities within the computer's memory or registers into other data similarly represented as physical quantities within the computer's memory, registers, or other such storage medium, transmission, or display devices.

As used herein, terms such as "connected," "coupled," or the like may refer to any connection or coupling, either direct or indirect, between two or more elements. The coupling or connection between the elements can be physical, logical, or a combination thereof.

Reference to "an embodiment" or "one embodiment" means that the particular feature, function, structure, or characteristic being described is included in at least one embodiment. Occurrences of such phrases do not necessarily refer to the same embodiment, nor are they necessarily referring to alternative embodiments that are mutually exclusive of one another.

Unless the context clearly requires otherwise, the words "comprise" and "comprising" are to be construed in an inclusive sense rather than an exclusive or exhaustive sense (i.e., in the sense of "including but not limited to"). The term "based on" is also to be construed in an inclusive sense rather than an exclusive or exhaustive sense. Thus, unless otherwise noted, the term "based on" is intended to mean "based at least in part on."

The term "module" refers broadly to software components, hardware components, and/or firmware components. Modules are typically functional components that can generate useful data or other output(s) based on specified input(s). A module may be self-contained. A computer program may include one or more modules. Thus, a computer program may include multiple modules responsible for completing different tasks or a single module responsible for completing multiple tasks.

When used in reference to a list of multiple items, the word "or" is intended to cover all of the following interpretations: any of the items in the list, all of the items in the list, and any combination of items in the list.

The sequences of steps performed in any of the processes described herein are exemplary. However, unless contrary to physical possibility, the steps may be performed in various sequences and combinations. For example, steps could be added to, or removed from, the processes described herein. Similarly, steps could be replaced or reordered. Thus, descriptions of any processes are intended to be open-ended.

Real-Time Streaming System

FIG. 1 illustrates a real-time streaming system 100 to stream video content to a plurality of client devices 114A-114C, in accordance with various embodiments. The system 100 may include one or more streaming servers 110 configured to encode and stream media content over a network 112, such as the Internet. The streaming servers 110 may receive media data from an external node (e.g., a client device, external server, a video camera). The streaming server 110 encodes and forwards the media data to client devices 114.

The media data includes a live video stream. As an example, the live video stream may be generated by an external node, forwarded through a network by a streaming server 110, and rendered by a client device 114 within a time duration that is unperceivable by a user of a client device 114. In some embodiments, the live video may include video that is near real-time. The live video may be transmitted to client devices such that users viewing the live video may naturally interact with the live video and react to the live video.

The term "live media stream" or "real-time stream" refers broadly to broadcasting an event on a network as it happens. This may include broadcasting content that is generated by a source device, transmitted through a network, and rendered by a receiving device with a latency/delay that is unperceivable by a user of the receiving device, which also may be referred to as "near real-time." Examples of such a latency that is unperceivable by a user of a device can include 100 ms, 300 ms, 500 ms, etc. Accordingly, users of client devices can interact with or respond to the live media stream in near real-time (i.e., with a delay that is unperceivable to the users of the client devices that are subscribed to the stream). In an illustrative example, participants subscribing to a real-time streamed show could directly communicate with and steer the actions of the performer (e.g., interacting with the performer in a standup comedy show, perhaps responding to questions). In another example, players in a real-time stream game of cards could place bets while cards are being turned.

As an example, a smartphone 114A may generate and transmit a live video (e.g., video capturing gameplay, video capturing the user's movement) to the streaming server 110. The streaming server 110 can encode the received live video and transmit the encoded video to other client devices (e.g., a laptop computer 114B or computer 114C). In this example, the other client devices may receive the encoded live video with a time delay that is unperceivable by a user (e.g., under 300 milliseconds) with minimal buffering. Furthering this example, laptop computer 114B can receive the live video and generate a second live video. The second live video may be transmitted to the streaming server 110, where the streaming server 110 encodes and transmits the second live video to the other client devices (such as the smartphone 114A or computer 114C). In this example, devices subscribed to the stream can interactively communicate via the live video stream with a delay/latency that is unperceivable by users of the devices 114A-C.

The streaming servers 110 transmit the encoded media stream (e.g., media stream 116) to client devices 114. A stream request 118 may indicate that a user of a client device 114 has requested to subscribe to the encoded media stream 116. For example, a user of laptop computer 114B can subscribe to a live video stream of a sporting event by transmitting a stream request to the streaming servers 110 over the network 112. Upon receipt of the streaming request, the streaming servers 110 can transmit the encoded video content to laptop computer 114B. The laptop computer 114B can then decode the encoded video data and output the live video stream of the sporting event on a display.

Figure 2:
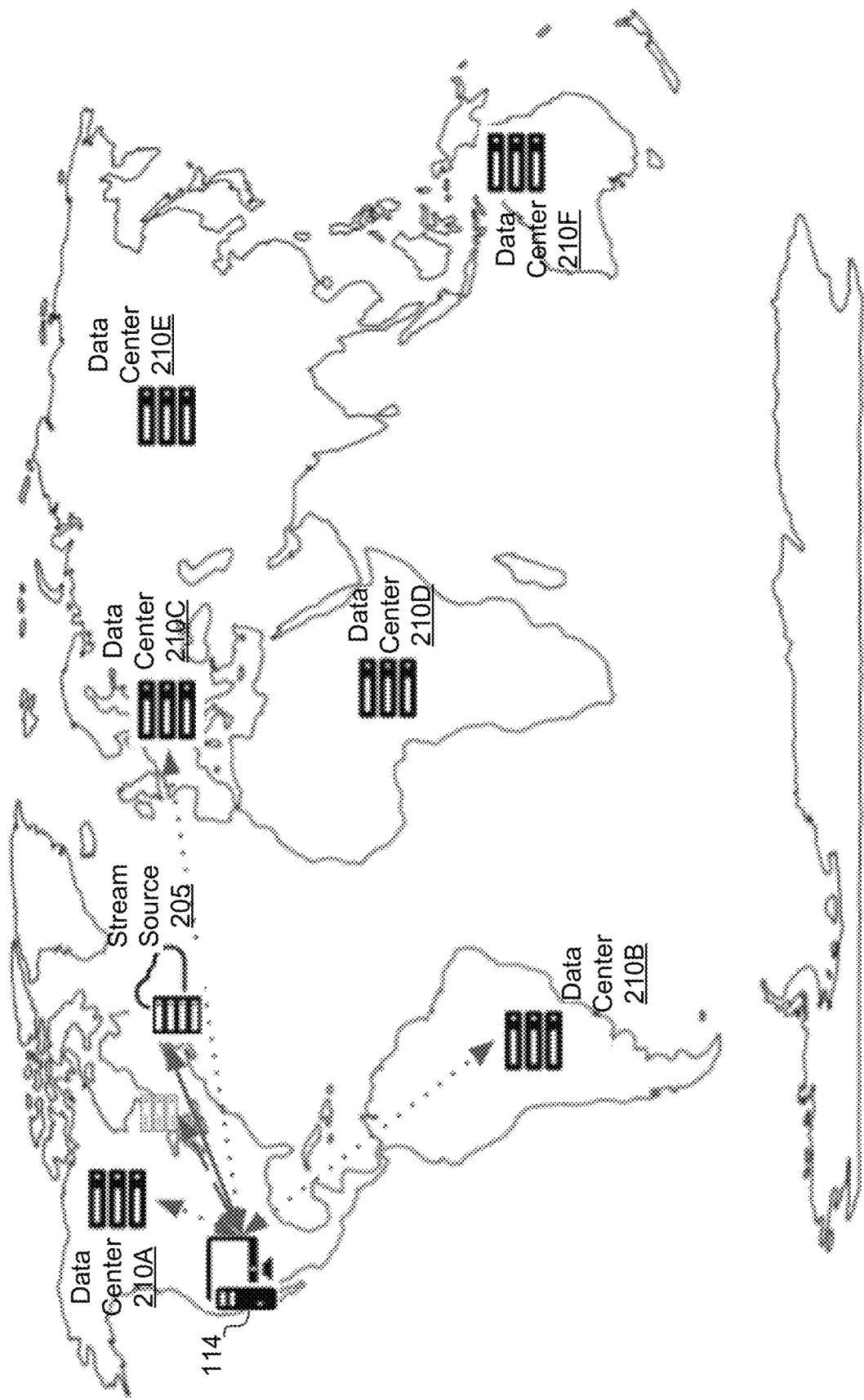
FIG. 2 illustrates an example architectural model of the real-time streaming system.

Given the limited benefits of content caching for real-time streaming and the fact that caching and buffering can introduce unacceptable delays on the stream, the system 100 leverages collections of servers (referred to herein as data centers or clusters) located at geographically distributed points of presence (PoPs). FIG. 2 illustrates an example architectural model of the system 100, which includes the client devices 114, a stream source 205, and data centers 210A-210F at various PoPs. The stream source 205 is a computing device used to capture and/or transmit a real-time stream of content and can, for example, be one of the client devices 114. Within each of the data centers 210, also referred to herein as endpoint server clusters, is a collection of servers and related computing and networking infrastructure, representing a quantity of computing resources that are available for distributing content from the stream source 205 to the client devices 114.

Before requesting access to an ongoing stream, the client device 114 typically selects a nearby PoP, for example by selecting a nearest PoP to a geographic location of the client or based on a response time of each of multiple data centers 210 to a request. Once a PoP has been selected, the client 114 sets and authenticates a persistent control channel that is in turn used to subscribe to a particular stream. By way of example, FIG. 2 illustrates a client device 114 located in southwestern United States. The client sends a request to data centers 210A (located in Canada), 210B (located in Brazil), and 210C (located in Germany) and selects whichever of the data centers has the shortest response time to the request.

The streaming servers 110 can provision and configure varying quantities of computing resources at each data center 210 to handle variable traffic loads. In general, the streaming servers 110 deploy additional computing resources to handle large volumes of streaming traffic and reduce resource use when traffic is lighter. For example, a baseline quantity of computing resources are deployed at a given data center 210, where the baseline is defined, for example, by the quantity of resources necessary to handle a median amount of streaming traffic passing through the data center 210. The streaming servers 110 increase the computing resources from the baseline when traffic increases and decreases the computing resources to a level at or above the baseline as traffic decreases. The baseline quantity can be defined by an administrator to balance factors such as expected streaming traffic, costs to maintain the baseline resources, or cost or time needed to scale up the resources if streaming traffic increases. Each data center 210 can be configured to manage different amounts of traffic, and the baseline resources can be increased or decreased over time as traffic patterns change. For example, if a streaming service is more popular in North America than in Australia, the baseline resources available through the data center 210A may be greater than those available at the data center 210F based on a determination that the North America data center 210A is likely to handle more traffic under ordinary conditions than the Australian data center 210F. But, if the streaming service gains popularity in Australia such that the average amount of traffic in the region increases, the baseline resources available through the Australian data center 210F can correspondingly be increased.

Figure 3:
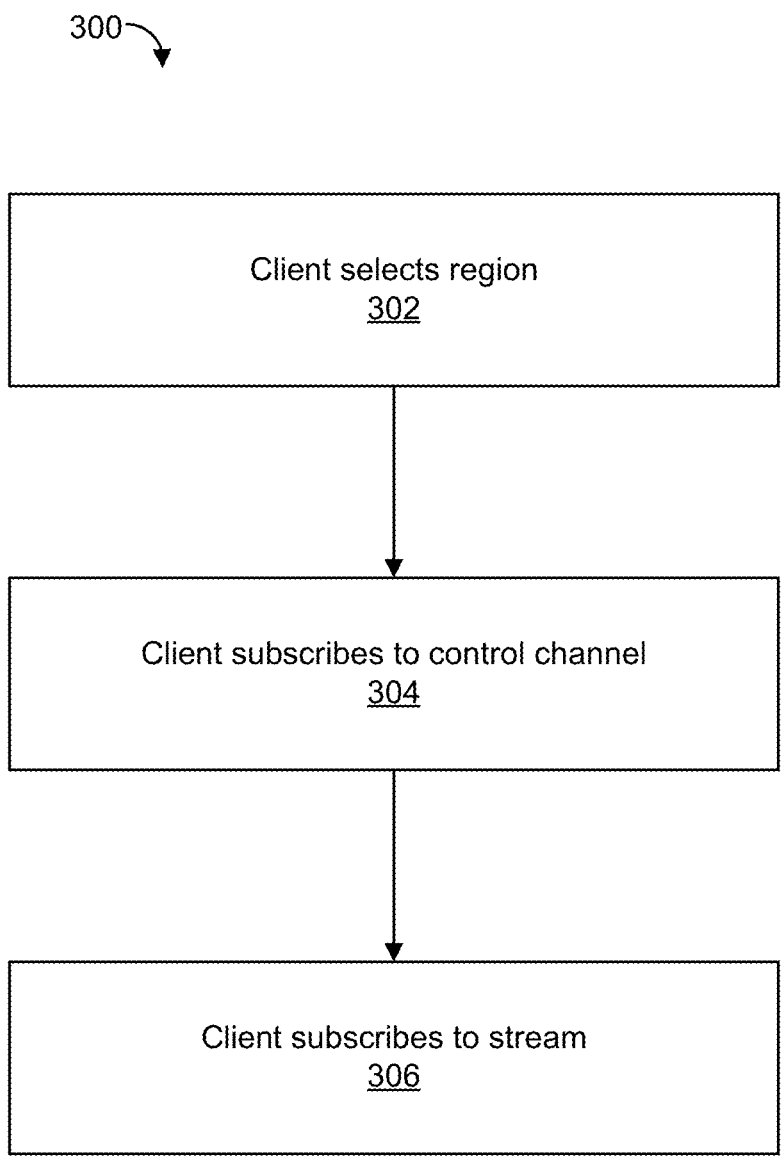
FIG. 3 is a flowchart illustrating a process performed by a client device to access a real-time stream.

When accessing a real-time stream, client devices 114 typically follow a series of steps to connect to a server and request access to the stream. FIG. 3 is a flowchart illustrating a process 300 performed by a client device 114 to access a real-time stream.

As shown in FIG. 3, the client device 114 begins the process of accessing a real-time stream by selecting a region at block 302. Block 302 is performed, for example, when a user uses the client device 114 to access a website or application associated with the real-time streaming service. In some embodiments, a client device 114 selects a region by sending a request to each of multiple data centers 210 and waits for a server response to each request. The client device 114 then selects the data center 210 from which the first server response was received. Client devices 114 may use one or multiple different types of request to select a region. For example, sending an Internet Control Message Protocol (ICMP) request packet (a "ping") may provide information about network latency between the client device 114 and each server, while a HyperText Transfer Protocol (HTTP) GET command provides information about both network latency and application layer response times. The client device 114 establishes a server connection with the selected endpoint.

At block 304, the client device 114 subscribes to a control channel. The control channel, which may be one of multiple channels available through the real-time streaming service, represents a source or author associated with media streams. For example, each control channel available in the real-time streaming service is affiliated with a stream source, and provides one or more real-time streams through the streaming service at a given time.

At block 306, the client device 114 subscribes to a particular stream available through the control channel that was selected at block 304. Block 306 can be performed, for example, in response to the user of the client device 114 selecting the desired stream from a list of streams available through the channel.

Flash Crowd Management in a Real-Time Streaming System

The streaming servers 110 detect incoming flash crowds and manage resources to mitigate the effects of the flash crowds by monitoring a rate at each of multiple steps within a defined process by which clients subscribe to a real-time stream. In general, flash crowds are detected based on an observation that client devices 114 follow the process described with respect to FIG. 3 when subscribing to a real-time stream, such that behaviors associated with each step of the process 300 correspond to progressively stronger signals indicating an incoming flash crowd.

Figure 4:
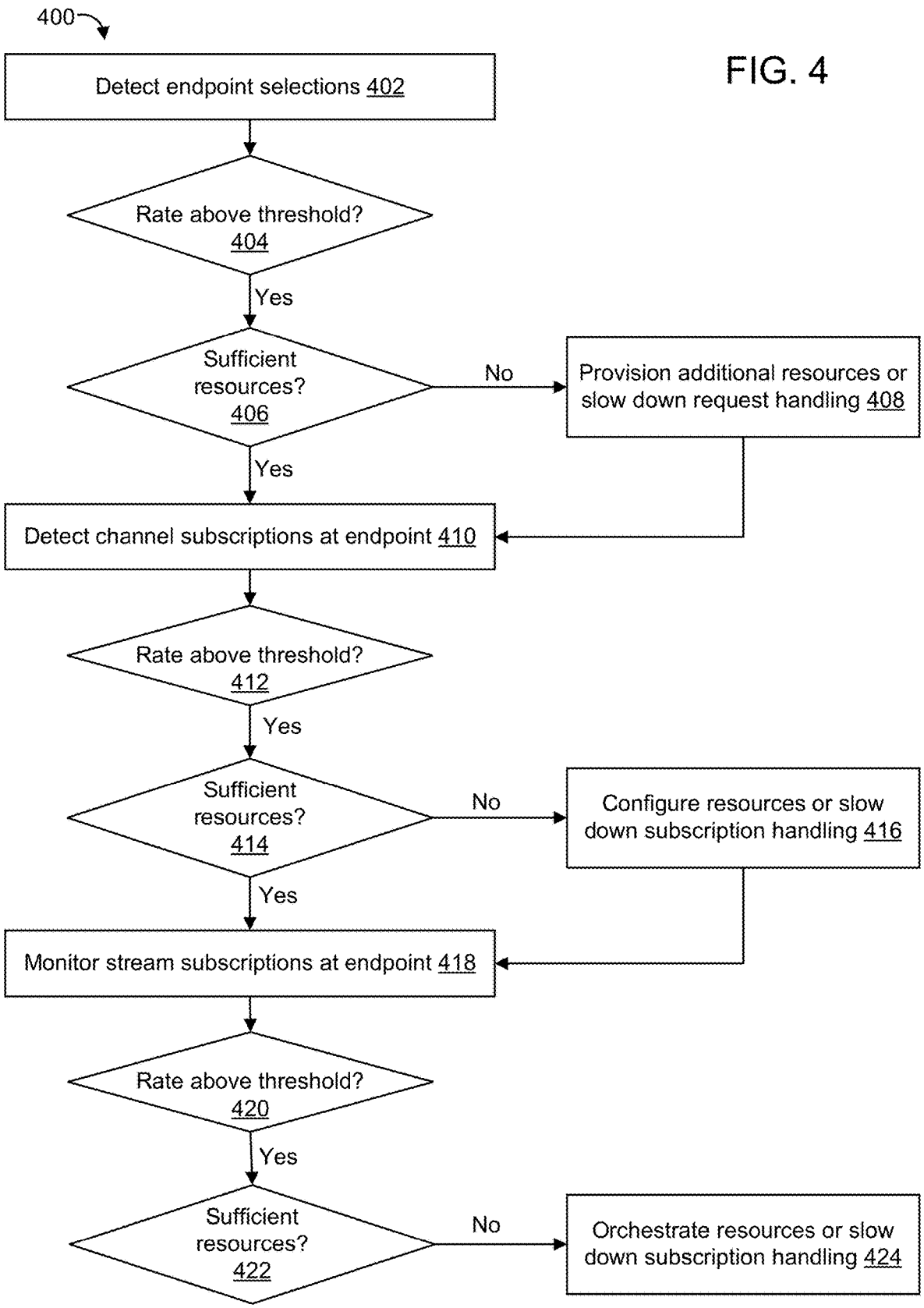
FIG. 4 is a flowchart illustrating a process for detecting incoming flash crowds to a real-time stream and managing resources to respond to the flash crowds.

FIG. 4 is a flowchart illustrating a process 400 for detecting incoming flash crowds to a real-time stream and managing resources to respond to the flash crowds. The process shown in FIG. 4 can be executed by the streaming servers 110, for example by using a processor to execute computer program instructions stored at the streaming servers 110. One or more steps of the process may be performed by devices other than the streaming servers 110 in some embodiments, such as a computing device within a data center 210.

As shown in FIG. 4, the streaming servers 110 detect, at block 402, endpoint selections made by client devices 114. Depending on a configuration of the streaming servers 110 and endpoint servers at the data centers 210, various endpoint selection signals can indicate the attempt by a client to communicate with a given endpoint. For example, the streaming servers 110 can measure a number of pings (ICMP request packets) received at a given data center 210 as an indicator of the number of clients attempting to stream through the data center 210. Another endpoint selection signal that can be measured by the streaming servers 110 is a number of HTTP GET requests received at a data center 210 from client devices 114 that are requesting access to content through the data center 210. Still another example endpoint selection signal is a rate at which transmission control protocol (TCP) connection requests are received or a rate at which TCP connections are set up. When detecting the endpoint selections at block 402, the streaming servers 110 can monitor any one of the endpoint selection signals or any combination of these signals.

At block 404, the streaming servers 110 determine whether the rate of selection of a given endpoint is greater than a threshold rate. In some embodiments, the streaming servers 110 measure the endpoint selection rate based on a rate of change of a number of clients 114 that select the given endpoint within a specified time period, as indicated by the endpoint selection signals. For example, the streaming servers 110 calculate an estimated load at a time t by the following equation:

$$\text{Estimated Load}_t = w * \text{MeasuredLoad}_t + (1-w) * \text{MeasuredLoad}_{t-1}$$

where MeasuredLoad_t is a measurement of a number of endpoint selections at time t, MeasuredLoad_(t−1) is a measurement of a number of endpoint selections at a previous time, and w is a configurable weight parameter. An administrator can define the weight parameter w to give higher weight to the past load estimate (at time t−1) or to give a higher weight to the current load estimate at time t. In other embodiments, the streaming servers 110 measure the endpoint selection rate based on a change between a rate of endpoint selections at a first time and a rate of endpoint selections at a second time. For example, the streaming servers 110 apply the equation above, using a measurement of a rate of change of endpoint selections at time t as MeasuredLoad_t and a rate of change of endpoint selections at time t−1 as MeasuredLoad_(t−1). After calculating the estimated load, whether as a rate of change of the number of endpoint selections or as a change in the rate of endpoint selections, the streaming servers 110 can calculate an estimated moving standard deviation (EMSD) of the endpoint selection rate using the following equation:

$$EMSD_t = \sqrt{w(MeasuredLoad_t - EstimatedLoad_t)^2 + (1-w)EstimatedLoad_{t-1}^2}$$

When determining whether the rate of selection of an endpoint is greater than the threshold rate at block 404, the streaming servers 110 can compare any of a variety of measurements of the endpoint selection rate to the threshold rate. Embodiments of the streaming servers 110 compare the threshold rate to, for example, the estimated moving standard deviation, the estimated load at time t, a value of the endpoint selection signal. Furthermore, the threshold to which the streaming servers 110 compare the endpoint selection rate can be a parameter that is configurable by an administrator of the streaming system 100, for example based on a quantity of available resources or expected stream subscriptions. However, in some cases, the threshold is a value selected by training a machine learning model using past observations of real-time streaming traffic to predict an endpoint selection rate that is indicative of an incoming flash crowd.

If the streaming servers 110 determine the rate of endpoint selections is less than the threshold at block 404, the streaming servers 110 continue to monitor endpoint selections until an above-threshold rate is detected. If instead the threshold is exceeded at block 404, the streaming servers 110 determine at block 406 whether a sufficient quantity of computing resources are currently available to handling incoming stream requests, given the rate of endpoint selections. For example, the streaming servers 110 determine whether the number of containers or virtual machines deployed at the endpoint is a baseline number or if additional resources above the baseline have already been deployed (e.g., in response to a previous increase in traffic through the endpoint).

If the configured computing resources are determined to be insufficient at block 406, the streaming servers 110 either provision additional resources, slow down request handling, or both at block 408. Provisioning resources can include, for example, deploying additional containers or virtual machines on the hardware available at the data center 210 to handle further incoming streaming requests. To slow channel subscriptions, the streaming servers 110 can, for example, insert artificial latency before responding to each request or a subset of the requests, or deny a subset of the requests to force clients 114 to attempt to reconnect at a later time.

After provisioning resources at block 408, or determining that the available resources are sufficient at block 406, the streaming servers 110 monitor channel subscriptions at the endpoint at block 410. Various channel subscription signals can be measured by the streaming servers 110, such as a rate of channel subscription requests, a channel subscription requests queue length, or a transport session request rate. Like the endpoint selection signals, the streaming servers 110 can monitor one or more channel subscription signals individually, or can combine multiple channel subscription signals to determine a rate of channel subscriptions.

At block 412, the streaming servers 110 determine whether a rate of subscriptions to a first channel at the endpoint is greater than a threshold rate. Like the rate of endpoint selections, the rate of channel subscriptions can be measured in various embodiments as a rate of change of a number of clients 114 that subscribe to a particular channel or a change between a rate of channel subscriptions at a first time and a rate of channel subscriptions at a second time, using for example the estimated load and estimated moving standard deviation equations provided above. Similarly, the threshold to which the rate of channel subscriptions is compared is a configurable parameter in some embodiments, set by an administrator based on factors such as available resources or expected stream subscriptions. The threshold can instead be set by applying a machine learning model trained to predict a subscription rate that is indicative of an incoming flash crowd.

If the rate of channel subscriptions to the first channel is determined to exceed the threshold at block 412, the streaming servers 110 determine at block 414 whether computing resources are sufficient. For example, the streaming servers 110 determine a capacity of the virtual machines or containers that are currently assigned to serve content from the first channel, comparing the capacity to a pre-configured threshold to determine whether the capacity is sufficient based on the rate of incoming channel subscription requests.

If the resources are determined to be insufficient, at block 416 the streaming servers 110 either configure some or all of the resources that were provisioned at block 408, slow subscription handling, or both. Resources configuration includes assigning newly provisioned resources to a channel server for the first channel, as well as configuring settings, network parameters, or other aspects of the resources that enable the resources to stream content from the first channel to the client devices 114.

After configuring resources at block 416 or determining that the available resources are sufficient at block 414, the streaming servers 110 monitor subscriptions to a particular stream at the endpoint. Stream subscription signals measured by the streaming servers 110 include, for example, an arrival rate of stream subscription requests, a stream subscription request queue length, or a transport session request rate. These or other stream subscription signals can be monitored individually or in combination as the streaming servers 110 determine a rate of subscriptions to the real-time streams.

At block 420, the streaming servers 110 determine whether a rate of subscriptions to a first stream at the endpoint is greater than a threshold rate. The rate of subscriptions to the first stream can be measured in various embodiments as a rate of change of a number of clients 114 that subscribe to the first stream or a change between a rate of stream subscriptions at a first time and a rate of stream subscriptions at a second time. Like the thresholds applied to the rate of endpoint selections and channel subscriptions described above, the threshold to which the rate of stream subscriptions is compared can be a parameter defined by an administrator or a threshold automatically selected by the streaming servers 110 by applying a trained machine learning model.

If the rate of subscriptions to the first stream is greater than the threshold, the streaming servers 110 determine at block 422 whether the resources currently deployed for handling streaming are sufficient. If the resources are not sufficient, the streaming servers 110 orchestrate resources, slow subscription handling, or both at block 424. Orchestrating resources can include configuring the newly configured resources and the previously existing resources to balance traffic between the resources and synchronize delivery of the real-time stream.

In some embodiments of the process 400, the streaming servers 110 use additional, higher thresholds to identify when an incoming flash crowd is increasing at a rate faster than the rate at which new resources can be deployed or will be too large for the finite resources available at each endpoint. The additional thresholds can be applied at any or all of blocks 404, 412, or 420, and set either manually by an administrator or automatically by the streaming servers 110. If the rate of endpoint selections, channel subscriptions, or stream subscriptions exceeds the corresponding additional threshold, the streaming servers 110 can determine that the number of stream subscriptions is likely to exceed the capacity of the resources available at the endpoint and can implement a procedure to either slow or stop processing of new selections or subscriptions until the threat has passed.

At any of various points within the process 400, embodiments of the streaming servers 110 can determine to relinquish or repurpose unneeded resources if the servers 110 detect the streaming traffic has slowed. For example, if the streaming servers 110 provision additional resources at block 408 after detecting an above-threshold rate of endpoint selections but subsequently determine that a flash crowd event did not occur, the streaming servers 110 may tear down the provisioned resources. Or, if the streaming servers 110 configure and orchestrate resources to manage an influx of stream subscriptions, the servers 110 can tear down or repurpose the resources after enough clients have disconnected from the stream.

The flash event detection process described with respect to FIG. 4 enables the streaming servers 110 to detect incoming flash crowds before traffic peaks. With early detection, the streaming servers 110 can provision and configure computing resources to handle the influx of traffic before clients attempt to connect to a stream. The streaming service provided by the streaming servers 110 is therefore more robust to the sudden traffic increases associated with flash crowd events, reducing the likelihood that the service will be overwhelmed or that the real-time interactivity of the stream will be compromised.

Example Processing System

Figure 5:
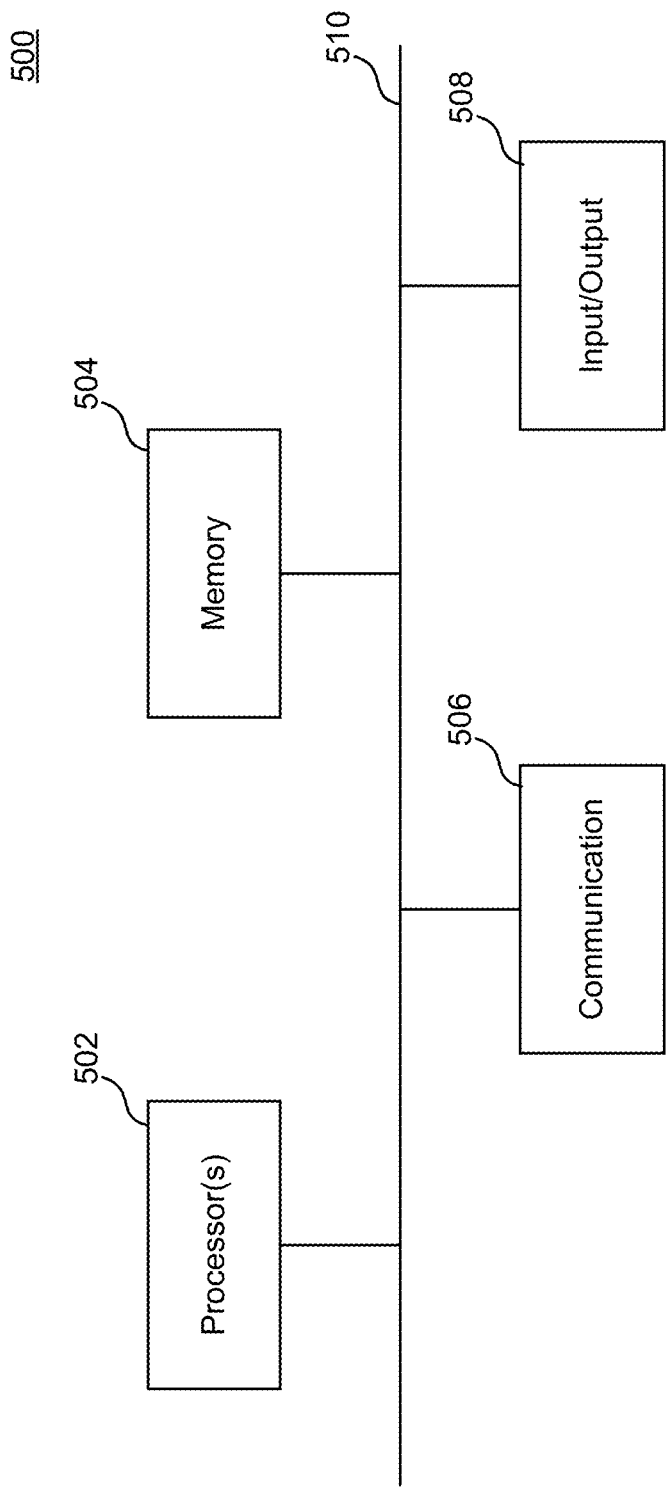
FIG. 5 is a block diagram illustrating an example of a processing system.

FIG. 5 is a block diagram illustrating an example of a processing system in which at least some operations described herein can be implemented. The processing system can be processing device 500, which represents a system that can run any of the methods/algorithms described above. For example, any of the streaming servers 110, the client devices 114, or computing devices associated with the endpoints can be implemented as the processing system 500. A system may include two or more processing devices such as represented in FIG. 5, which may be coupled to each other via a network or multiple networks. A network can be referred to as a communication network.

In the illustrated embodiment, the processing device 500 includes one or more processors 502, memory 504, a communication device 506, and one or more input/output (I/O) devices 508, all coupled to each other through an interconnect 510. The interconnect 510 may be or include one or more conductive traces, buses, point-to-point connections, controllers, adapters and/or other conventional connection devices. Each of the processors 502 may be or include, for example, one or more general-purpose programmable microprocessors or microprocessor cores, microcontrollers, application specific integrated circuits (ASICs), programmable gate arrays, or the like, or a combination of such devices.

The processor(s) 502 control the overall operation of the processing device 500. Memory 504 may be or include one or more physical storage devices, which may be in the form of random-access memory (RAM), read-only memory (ROM) (which may be erasable and programmable), flash memory, miniature hard disk drive, or other suitable type of storage device, or a combination of such devices. Memory 504 may store data and instructions that configure the processor(s) 502 to execute operations in accordance with the techniques described above. The communication device 506 may be or include, for example, an Ethernet adapter, cable modem, Wi-Fi adapter, cellular transceiver, Bluetooth transceiver, or the like, or a combination thereof. Depending on the specific nature and purpose of the processing device 500, the I/O devices 508 can include devices such as a display (which may be a touch screen display), audio speaker, keyboard, mouse or other pointing device, microphone, camera, etc.

While processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations, or may be replicated (e.g., performed multiple times). Each of these processes or blocks may be implemented in a variety of different ways. In addition, while processes or blocks are at times shown as being performed in series, these processes or blocks may instead be performed in parallel or may be performed at different times. When a process or step is "based on" a value or a computation, the process or step should be interpreted as based at least on that value or that computation.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM), random-access memory (RAM), magnetic disk storage media, optical storage media, flash memory devices), etc.

Note that any and all of the embodiments described above can be combined with each other, except to the extent that it may be stated otherwise above or to the extent that any such embodiments might be mutually exclusive in function and/or structure. Although the present invention has been described with reference to specific exemplary embodiments, it will be recognized that the invention is not limited to the embodiments described but can be practiced with modification and alteration within the spirit and scope of the disclosed embodiments. Accordingly, the specification and drawings are to be regarded in an illustrative sense rather than a restrictive sense.

Physical and functional components (e.g., devices, engines, modules, and data repositories) associated with processing device 500 can be implemented as circuitry, firmware, software, other executable instructions, or any combination thereof. For example, the functional components can be implemented in the form of special-purpose circuitry, in the form of one or more appropriately programmed processors, a single board chip, a field programmable gate array, a general-purpose computing device configured by executable instructions, a virtual machine configured by executable instructions, a cloud computing environment configured by executable instructions, or any combination thereof. For example, the functional components described can be implemented as instructions on a tangible storage memory capable of being executed by a processor or other integrated circuit chip. The tangible storage memory can be computer-readable data storage. The tangible storage memory may be volatile or non-volatile memory. In some embodiments, the volatile memory may be considered "non-transitory" in the sense that it is not a transitory signal. Memory space and storage described in the figures can be implemented with the tangible storage memory as well, including volatile or non-volatile memory.

Each of the functional components may operate individually and independently of other functional components. Some or all of the functional components may be executed on the same host device or on separate devices. The separate devices can be coupled through one or more communication channels (e.g., wireless or wired channel) to coordinate their operations. Some or all of the functional components may be combined as one component. A single functional component may be divided into sub-components, each sub-component performing separate method steps or a method step of the single component.

In some embodiments, at least some of the functional components share access to a memory space. For example, one functional component may access data accessed by or transformed by another functional component. The functional components may be considered "coupled" to one another if they share a physical connection or a virtual connection, directly or indirectly, allowing data accessed or modified by one functional component to be accessed in another functional component. In some embodiments, at least some of the functional components can be upgraded or modified remotely (e.g., by reconfiguring executable instructions that implement a portion of the functional components). Other arrays, systems and devices described above may include additional, fewer, or different functional components for various applications.

Aspects of the disclosed embodiments may be described in terms of algorithms and symbolic representations of operations on data bits stored in memory. These algorithmic descriptions and symbolic representations generally include a sequence of operations leading to a desired result. The operations require physical manipulations of physical quantities. Usually, though not necessarily, these quantities take the form of electric or magnetic signals that are capable of being stored, transferred, combined, compared, and otherwise manipulated. Customarily, and for convenience, these signals are referred to as bits, values, elements, symbols, characters, terms, numbers, or the like. These and similar terms are associated with physical quantities and are merely convenient labels applied to these quantities.

While embodiments have been described in the context of a fully functioning computers, those skilled in the art will appreciate that the various embodiments are capable of being distributed as a program product in a variety of forms and that the disclosure applies equally, regardless of the particular type of machine or computer-readable media used to actually effect the embodiments.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. A method comprising:
   configuring, by a computer system, a first quantity of computing resources at an endpoint server cluster to stream a real-time content stream;
   determining, by the computer system, a first rate of requests by client devices to connect to the endpoint server cluster;
   responsive to determining the first rate of the requests to connect to the endpoint server cluster is greater than a first threshold, slowing, by the computer system, a rate of handling of subsequent requests by client devices to connect to the endpoint server cluster;
   after slowing the rate of handling of the subsequent requests, monitoring by the computer system, subscriptions by the client devices to a control channel at the endpoint server cluster, wherein the subscriptions are based on requests to connect to the control channel at the endpoint server cluster;
   determining, by the computer system, a second rate of the subscriptions to the control channel at the endpoint server cluster; and
   responsive to determining the second rate of the subscriptions to the control channel is greater than a second threshold, slowing, by the computer system, a rate of handling of subsequent subscriptions to the control channel at the endpoint server cluster.

2. The method of claim 1, wherein slowing the rate of handling of the subsequent requests comprises:
   inserting artificial latency between handling of a first subsequent request to connect to the endpoint server cluster and handling of a second subsequent request to connect to the endpoint server cluster.

3. The method of claim 1, wherein slowing the rate of handling of the subsequent requests comprises:
   denying a subset of the subsequent requests.

4. The method of claim 1, further comprising:
   responsive to determining the first rate of the requests to connect to the endpoint server cluster is greater than a third threshold but lower than the first threshold, provisioning, by the computer system, a second quantity of computing resources at the endpoint server cluster.

5. The method of claim 4, further comprising:
   responsive to determining the second rate of the subscriptions to the control channel is greater than a fourth threshold:
      configuring, by the computer system, the provisioned second quantity of computing resources for streaming the real-time content stream to one or more of the client devices;
      wherein the fourth threshold is lower than the second threshold.

6. The method of claim 4, further comprising:
   monitoring, by the computer system, subscriptions by the client devices to the real-time content stream on the control channel; and
   responsive to determining a third rate of the subscriptions to the real-time content stream is greater than a fifth threshold, orchestrating the first quantity of computing resources and the second quantity of computing resources to deliver the real-time content stream to the client devices.

7. The method of claim 6, wherein monitoring the subscriptions by the client devices to the real-time content stream on the control channel comprises detecting at least one of:
   a rate of stream subscription requests associated with the real-time content stream,
   a stream subscription request queue length associated with the real-time content stream, or
   a rate of transport session requests associated with the real-time content stream.

8. The method of claim 1, wherein determining the rate of requests by the client devices comprises:
   detecting the requests by the client devices to connect to the control channel at the endpoint server cluster based on at least one of:
      a number of Internet Control Message Protocol (ICMP) packets received at the endpoint server cluster from the client devices,
      a number of Hypertext Transfer Protocol (HTTP) GET requests received at the endpoint server cluster from the client devices, or
      a number of Transmission Control Protocol (TCP) connection requests received at the endpoint server cluster from the client devices.

9. The method of claim 1, wherein determining the rate of the subscriptions by the client devices comprises:
   monitoring the subscriptions by the client devices to the control channel; and
   detecting at least one of:
      a rate of channel subscription requests associated with the control channel, a channel subscription request queue length associated with the control channel, or a rate of transport session requests associated with the control channel.

10. A non-transitory computer readable storage medium storing executable computer program instructions, the computer program instructions when executed by a processor causing the processor to:

configure a first quantity of computing resources at an endpoint server cluster to stream a real-time content stream;

determine a first rate of requests by client devices to connect to the endpoint server cluster;

responsive to determining the first rate of the requests to connect to the endpoint server cluster is greater than a first threshold, provision a second quantity of computing resources at the endpoint server cluster;

after provisioning the second quantity of computing resources, monitor subscriptions by the client devices to a control channel at the endpoint server cluster, wherein the subscriptions are based on requests to connect to the control channel at the endpoint server cluster;

determine a second rate of the subscriptions to the control channel at the endpoint server cluster; and responsive to determining the second rate of the subscriptions to the control channel is greater than a second threshold, automatically slow a rate of handling of subsequent subscriptions to the control channel at the endpoint server cluster.

11. The non-transitory computer readable storage medium of claim 10, wherein slowing the rate of handling of the subsequent subscriptions comprises:

inserting artificial latency between handling of a first subsequent subscription to the control channel and handling of a second subsequent subscription to the control channel.

12. The non-transitory computer readable storage medium of claim 10, wherein slowing the rate of handling of the subsequent subscriptions comprises:

denying a subset of the subsequent subscriptions.

13. The non-transitory computer readable storage medium of claim 10, further comprising:

responsive to determining the second rate of the subscriptions to the control channel is greater than a third threshold:

configuring the provisioned second quantity of computing resources for streaming the real-time content stream to one or more of the client devices;

wherein the third threshold is lower than the second threshold.

14. A real-time streaming system comprising:

an endpoint server cluster including first computing resources configured to stream a real-time content stream to client devices; and a streaming server communicatively coupled to the endpoint server cluster and configured to:

detect actions by a plurality of client devices during a multi-step process to access the real-time content stream from the endpoint server cluster;

in response to detecting that a first rate at which the plurality of client devices perform an action associated with a first step in the multi-step process is greater than a first threshold:

provision second computing resources different from the first computing resources at the endpoint server cluster; and after provisioning the second computing resources, in response to detecting that a second rate at which the plurality of client devices perform an action associated with a second step in the multi-step process is greater than a second threshold:

automatically slow a rate of handling of the action associated with the second step; or configure the provisioned second computing resources at the endpoint server cluster to stream the real-time content stream based on a rate at which the plurality of client devices perform an action associated with a second step in the multi-step process.

15. The real-time streaming system of claim 14, wherein slowing the rate of handling of the action associated with the second step comprises:

inserting artificial latency between handling of a first action associated with the second step and handling of a second action associated with the second step.

16. The real-time streaming system of claim 14, wherein slowing the rate of handling of the action associated with the second step comprises:

for a subset of the plurality of client devices, denying the action associated with the second step.

17. The real-time streaming system of claim 14, wherein configuring the provisioned second computing resources at the endpoint server cluster comprises:

configuring the provisioned second computing resources responsive to determining the second rate is greater than a third threshold;

wherein the third threshold is lower than the second threshold.

18. The real-time streaming system of claim 14, wherein the action associated with the first step in the multi-step process comprises establishing a connection between a client device and the endpoint server cluster, and wherein the streaming server is configured to measure the rate at which the plurality of client devices perform by the action associated with the first step using an endpoint selection signal.

19. The real-time streaming system of claim 14, wherein the action associated with the second step in the multi-step process comprises requesting access to a control channel, and wherein the streaming server is configured to measure the rate at which the plurality of client devices perform by the action associated with the second step using a channel subscription signal.

20. The real-time streaming system of claim 14, wherein the streaming server is further configured to:

responsive to determining that the rate at which the plurality of client devices perform the action associated with the first step in the multi-step process is greater than a third threshold, slowing handling of requests to perform the first step;

wherein the third threshold is lower than the first threshold.

* * * * *